United States Patent
Hoechsmann et al.

(10) Patent No.: US 6,423,255 B1
(45) Date of Patent: Jul. 23, 2002

(54) METHOD FOR MANUFACTURING A STRUCTURAL PART BY DEPOSITION TECHNIQUE

(76) Inventors: Rainer Hoechsmann, Schlossstr. 16, 86682, Genderkingen; Ingo Ederer, Holzbauerstr. 4, 86911, Riederau, both of (DE)

( * ) Notice: Subject to any disclaimer, the term of this patent is extended or adjusted under 35 U.S.C. 154(b) by 0 days.

(21) Appl. No.: 09/529,721

(22) PCT Filed: Mar. 24, 2000

(86) PCT No.: PCT/EP00/02645

§ 371 (c)(1),
(2), (4) Date: Aug. 14, 2000

(87) PCT Pub. No.: WO01/72502

PCT Pub. Date: Oct. 4, 2001

(51) Int. Cl.[7] .............................. B28B 1/16; B29C 67/00; B41J 2/01
(52) U.S. Cl. .................... 264/113; 347/1; 425/81.1; 425/91; 425/145
(58) Field of Search ................ 264/113; 425/81.1, 425/91, 145; 347/1

(56) References Cited

U.S. PATENT DOCUMENTS

| | | |
|---|---|---|
| 4,247,508 A | 1/1981 | Housholder |
| 4,600,733 A | 7/1986 | Ohashi et al. |
| 4,752,498 A | 6/1988 | Fudim |
| 5,182,170 A | 1/1993 | Marcus et al. |
| 5,204,055 A | 4/1993 | Sachs et al. |
| 5,324,617 A | 6/1994 | Majima et al. |
| 5,503,785 A | 4/1996 | Crump et al. |
| 5,518,060 A | 5/1996 | Cleary et al. |
| 5,616,631 A | 4/1997 | Kuichi et al. |
| 5,637,175 A | 6/1997 | Feygin et al. |
| 5,884,688 A | 3/1999 | Hinton |

FOREIGN PATENT DOCUMENTS

| | | |
|---|---|---|
| DE | 32 21 357 A1 | 12/1983 |
| DE | 39 30 750 A1 | 3/1991 |
| DE | 43 05 201 C1 | 4/1994 |
| DE | 44 00 523 A1 | 7/1995 |
| DE | 44 36 695 C1 | 12/1995 |
| DE | 195 38 257 A1 | 4/1996 |
| DE | 195 15 165 A1 | 10/1996 |
| DE | 195 28 215 A1 | 2/1997 |
| EP | 0 322 257 A2 | 6/1989 |
| EP | 0 431 924 A2 | 6/1991 |
| EP | 0 490 546 A1 | 6/1992 |
| EP | 0 581 445 A1 | 2/1994 |
| EP | 0 686 481 A1 | 12/1995 |
| WO | WO 95/05935 | 3/1995 |
| WO | WO 95/13565 | 5/1995 |
| WO | WO 96/12610 | 5/1996 |

*Primary Examiner*—Leo B. Tentoni
(74) *Attorney, Agent, or Firm*—Rutan & Tucker LLP; Robert D. Fish

(57) ABSTRACT

A method for manufacturing a structural part by a multi-layer deposition technique, in particular a part in the form of a casting mold or a casting core, a porous first layer of bulk particulate material consisting of particles of a predetermined particle size being deposited to form a layer of a predetermined layer thickness, a predetermined dose of liquid binder material being applied onto the layer, so that the liquid binder material penetrates the layer and becomes distributed within the layer and wets the particles of the layer and a predetermined residual porosity of the layer remains after distribution, a predetermined dose of liquid curing agent being selectively applied to a predetermined sub-area of the layer containing the binder material, a second layer being deposited on the first layer containing the binder material and the curing agent and being treated with a binder material and selectively with a liquid curing agent, the curing agent being applied to the second layer before the binder material of the first layer has cured.

24 Claims, 2 Drawing Sheets

METHOD FOR MANUFACTURING A STRUCTURAL PART BY DEPOSITION TECHNIQUE

The present invention relates to a method for manufacturing a structural part by a multi-layer deposition technique, in particular a part in the form of a casting mold or a casting core, an apparatus for performing the method as well as casting molds and cores manufactured according to the method.

A conventional manufacturing process for metal casting molds and cores uses Croning Sand, a granular material consisting of resin-coated sand particles, e.g. quartz or zircon sand, which is filled into frames. A negative cavity of the casting is formed by inserting a positive model of the structural part to be produced into the frame and embedding it in Croning Sand. Usually, the complete Croning Sand filling of the frame, which will subsequently be used as a mold, will then be bonded together in one step by means of a heating process. Manufacturing of the positive model is accomplished by conventional model making processes such as numerically controlled milling or turning and is thus time-consuming and expensive.

With the help of a deposition technique, also referred to as rapid prototyping process, in which the mold material is applied and solidified in layers, molds, models or other structural parts can be manufactured quicker and at lower costs. Selective Laser Sintering (SLS) according to WO 88/02677 is an example of a known method using a deposition technique (i.e. a rapid prototyping process). In this process a granular sintering material is applied in layers. The respectively uppermost layer of the sintering material is selectively partially melted by a slewable laser beam, thus bonding together the previously granular material in predetermined sub-areas. Subsequently, the next layer of granular material is deposited and partially melted selectively, the material in the partially molten areas being bonded within the layer and between the uppermost layer and the underlying layer. In this way, a three-dimensional solid body consisting of a granular sintering material bonded together by melting is formed.

However, apparatus for carrying out the SLS process are complex and expensive, in particular in view of the required laser scanning technique. The laser beam in such an apparatus can only be slewed to a limited extent, so that the maximum size of the structural part to be produced is limited Furthermore, some materials cannot be used for this process, since their melting-point is too high or too low. Low melting temperatures lead to manufacturing inaccuracies, high melting temperatures require a complex machinery and lead to a low manufacturing speed. Apart from this, the manufacturing speed is already low, since a laser scanning process is used, so that the SLS process is relatively time-consuming and thus expensive and inconvenient.

An SLS-type process is disclosed in U.S. Pat. No. 5,182,170 (Marcus et al.). In this process a layer of powder mixed with a binder material is applied to a base. The powder is exposed to the atmosphere of a reactive gas, so that the powder is activated. In this atmosphere heat is locally selectively admitted onto the powder. This causes a selective chemical reaction of the powder mixed with the binder, the powder being selectively solidified. For example a laser can serve as a source of heat.

A further method using a deposition technique is known from EP-0 431 924 B1 (equivalent: U.S. Pat. No. 5,204,055; Sachs et al.). In this process a layer of particulate material (e.g. ceramics or metal) is deposited. By selectively applying a binder material a predetermined area of the particle layer is bonded together and to the layer produced in the previous cycle. This process is repeated layer after layer. In a last step the particulate material which has remained unwetted by the binder material and therefore unbonded is removed. In this way a three-dimensional body has been created layer by layer. The binder material can be applied at low cost by means of a drop-on-demand dosing head (e.g. an ink jet print head). The particulate material could be e.g. ceramic powder, the binder materials e.g. a colloidal suspension. The binder material is made to cure by supplying energy, e.g. in the form of radiation, or cures automatically after some time by way of a chemical reaction.

In the process according to EP-0 431 924 B1 a problem is caused by the binder material, which must be applied in large amounts in order to ensure stable bonding. In order to achieve bonding between the neighbouring particles within a layer or within neighbouring layers, the binder material must reach the contact areas between the neighbouring particles as precisely as possible. In order to ensure this, an excess of binder material is used. This causes the binder material to spread inhomogeneously in the particle layer, forming relatively large accumulations of binder material in cavities in the particle layer. As the material solidifies the accumulations form inclusion which impair the quality of the part.

The large amount of binder material which has to be applied involves two further problems. It is an advantage that the drop-on-demand printing devices which are usually used for applying the binder material are commercially available standard articles, so that the process of applying the binder can be carried out at low cost; however, they can only achieve a limited material output rate. Therefore, the manufacturing speed which can be achieved with processes, in which binder material is applied as described above, is severely limited as long as the inexpensive drop-on-demand printing devices are used. Furthermore, when using a drop-on-demand print head the binder tends to cure also on the print head and thus to plug the print head, so that frequent cleaning of the print head is required, which in turn is time-consuming and costly.

Patent specification DE 197 23 892 B (Höchsmann et al.) (patent application U.S. Ser. No. 09/089,444) therefore suggests a different method for producing molds. Instead of the particulate material a composite material comprising particles with a binder material coating is deposited. In a next step a moderating agent is applied selectively, so that the specific energy necessary for bonding and thus solidifying the composite material by partially melting or by chemical reaction of the binder material is reduced or increased from a start level by a discrete differential amount to a final level different from the start level. Subsequently, energy is induced with a level of specific energy between the start level and the final level, so that either the area wetted by the moderating agent or the area free of moderating agent will be solidified, depending on whether the specific energy has been reduced or increased. Since a considerably smaller amount of moderating agent needs to be applied than is the case when selectively applying a binder, high manufacturing speeds can be reached even if inexpensive drop-on-demand print heads are used.

However, since the moderating agent becomes distributed in a relatively uncontrolled way in the uppermost layer and in the structure that has already formed, the clearness of modulation between the solidified and the non-solidified parts of the layer and thus the manufacturing accuracy could be impaired.

A process similar to the one set forth in DE 197 23 892 is disclosed in WO 98/09798 (Bredt). In contrast to DE 197 23 892, WO 98/09798 describes a process, in which a mixture of filler particles and adhesive particles are applied to form a layer. In a next step a liquid (a solvent) which activates the adhesive is applied to a sub-area of the layer, so that the particles of the layer adhere to each other in such a fashion that the particles in this sub-area form a single body. E.g. maltodextrin can be used as the filler, e.g. sucrose can be used as the adhesive, and e.g. water can be used as the activating liquid (solvent). In this process the achievable manufacturing accuracy is also restricted by the fact that the liquid used for activation (or the solvent, respectively) can spread in an uncontrolled way in the uppermost layer.

The present invention solves the problem to provide a rapid prototyping process for manufacturing parts, in particular molds or cores, which can be performed with an inexpensive apparatus and at the same time combines a high manufacturing speed and good manufacturing accuracy, as well as to provide an inexpensive apparatus adapted to performing the method.

The objects of the invention are accomplished by a method for manufacturing a structural part by a multi-layer deposition technique, in particular a structural part in the form of a casting mold or a casting core, the depositing technique comprising deposition of particulate material in several stacked adjacent layers which become bonded to each other at predetermined sub-areas of the respective adjacent layers, wherein a) a porous first layer of bulk or strewable particulate material consisting of particles of a predetermined particle size is deposited to form a layer of a predetermined layer thickness, b) a predetermined dose of liquid binder material is applied onto at least the sub-area of the first layer, so that the liquid binder material penetrates at least the sub-area of the first layer and becomes distributed within the sub-area and wets the particles of the sub-area and a predetermined residual porosity of the sub-area remains after distribution of the binder material, c) a predetermined dose of liquid curing agent, which causes the binder material to cure within a predetermined period of time, is selectively applied to the predetermined sub-area of the first layer containing the binder material, so that the curing agent becomes distributed in the predetermined sub-area of the first layer, d) a second layer is deposited in accordance with step a) on the first layer containing the binder material and the curing agent and is treated with a binder material in accordance with step b) and is treated with a liquid curing agent in accordance with step c) in the predetermined sub-area of the second layer overlapping at least part of the sub-area of the first layer, the curing agent being applied to the predetermined sub-area of the second layer within the predetermined period of time, during which the binder material of the first layer cures selectively in the sub-area of the first layer, so that the binder material in the sub-area of the second layer is bonded to the curing binder material in the sub-area of the first layer before the curing binder material in the sub-area of the first layer has finally cured.

According to the method of the present invention a certain dose of the binder material is applied in a liquid state to the particle layer which has been previously deposited, so that the particulate material is merely wetted by the liquid binder material and the binder material is prevented from spreading inhomogeneously forming local accumulations of binder, which would reduce the quality of the parts manufactured according to the process. The binder material may be applied to the whole surface of the layer, which makes it possible to reach high manufacturing speeds in comparison with other processes.

According to the method of the present invention the binder material and the curing agent are selected in such a fashion that they can act as the components of a two-component adhesive. The binder is applied at least onto the respective sub-area of the respective layer; the curing agent is the material to be selectively applied only in the sub-areas which are to cure. When a suitable combination of binder material and curing agent is used, only a small amount of curing agent must be applied in order to cure a larger amount of binder material. This only small amount of curing agent can easily be applied at low cost by means of a conventional drop-on-demand print head, which can only supply restricted amounts of material. Furthermore, since the curing agent alone does not cure and thus remains liquid, the print head is prevented from plugging during the application process.

The binder material, the curing agent, the doses of binder material and curing agent in relation to each other and to the respective volume of particulate material per layer and the process conditions are adjusted such the curing time of the binder material in the predetermined sub-area of the first layer has not cured completely when the second layer is applied and treated with binder material and curing agent. This ensures that the binder material and/or the curing agent penetrate the lower layer only to a small extent and that the sub-areas of the individual layers bond together in the overlapping protions thereof, so that a coherent three-dimensional body is created.

The use of a suitable two-component adhesive has also advantages in comparison with a system using a binder and a moderator by means of which the binder is activated. Since according to the method of the present invention the binder material starts curing only but immediately after the curing agent has been applied, the binder and/or curing agent are prevented from flowing in an uncontrolled way between sub-areas to be cured and sub-areas not to be cured, or at least their flowing is reduced considerably, so that the manufacturing accuracy is increased.

Sand, e.g. a quartz sand, a silicate sand, a chromite sand, an olivine sand or a zircon sand, which can be untreated, is preferably used as particulate material. However, it is also possible to use some other adequate bulk particulate material. Untreated materials have the advantage of being less expensive than materials which have already been pretreated with a binder, which are e.g. required for laser sintering methods.

The particle size of the particulate material should range from 100 to 200 $\mu$m, preferably from 110 to 160 $\mu$m. It is also possible to use smaller or larger particles. However, particles which are too small can be very easily influenced by air blasts, which makes a homogeneous deposition of the particles rather difficult. With particles which are too large (the surface of) the finished structural part will have an undesirably granular structure. Typically, the average diameter or the average size, respectively, of the particles is approximately 140 $\mu$m.

The thickness of the individual layers of particulate material is variable. Thin layers make it possible to produce constructive details of the structural part to be manufactured with a higher resolution. However, when the layers are very thin, it is not possible to increase the resolution by a further reduction of the thickness, since the resolution is then limited by process fluctuations. Furthermore, if the layers are too thin, the manufacturing speed will be low, since a large number of layer deposition steps is required. If the layers are thicker, the achievable manufacturing speed is increased; however, this does not hold true for any layer thickness desired. When the layers are too thick, it is difficult to apply the binder material and the curing agent homogeneously to the layer of particulate material, so that these steps take longer and the manufacturing speed cannot be considerably increased or even will be reduced if the layer thickness is further increased. Furthermore, if thicker layers are used, only a lower resolution with respect to the constructive details of the structural part to be produced can be achieved. Preferably, the layer thickness ranges from 0.15 to 0.3 mm, since in this way on the one hand a relatively high manufacturing speed can be achieved, and on the other hand a sufficient bonding between the successive layers as well as a sufficient resolution with respect to the details of the structural part can be reached.

The layer thickness can be varied in the process of manufacturing a part. For example, in those areas of the structural part that comprise only few constructive details a greater layer thickness can be selected in order to increase the manufacturing speed. In those areas of the structural part that comprise more complex and small constructive details a reduced layer thickness can be selected, so that in these areas the resolution and the manufacturing accuracy are increased.

The sufficiently liquid binder material is selected such that a predetermined dose of it can be applied to the particle layer and becomes distributed within the particle layer by means of the capillar forces acting in the cavities between the particles, so that the particles are wetted. These processes can be optimized by selecting a suitable viscosity and dosing rate of the binder material. The amount of binder is determined in such a way that a residual porosity is maintained in the particle layer, so that in the subsequent step of applying the liquid curing agent the curing agent is also spread in the particle layer, which has been treated with the binder material, by means of capillar forces acting in the cavities, and wets the particles which have already been wetted by the binder material. The predetermined dosage of the binder material is preferentially selected such that the ratio between binder material and particulate material with respect to their weight is less than 4 per cent, and preferably ranges from 2 to 3 per cent. The amount of binder material applied relative to the amount of particulate material- can vary from layer to layer.

Furthermore, by dosing the binder material accordingly, it is also possible to maintain a certain residual porosity in the solidified body even after curing, so that gases that are produced in a subsequent casting process can escape.

When manufacturing a mold or a core the dosage of the binder material is preferably selected such that, when using the mold or the core for producing a casting from a molten mass, on the one hand the mold or the core withstand the pressure of the molten mass as long as it is not yet dimensionally stable, and on the other hand the binder material has vaporized at least to a large extent when the molten mass has partly solidified to such an extent that the casting is essentially dimensionally stable. After the casting has solidified the mold can simply be destroyed, so that the casting can very easily be removed from the mold (lost-form method).

The liquid binder material can e.g. be applied to the particle layer in the form of a jet. Preferably, however, the binder material is applied in the form of liquid droplets of a predetermined diameter, since in this way the binder material can be spread very homogeneously. The diameter of the droplets preferably ranges from 5 to 50 $\mu$m. With droplets whose diameter is smaller than approximately 5 $\mu$m frictional forces in the air are no longer negligible relative to gravity, which makes it difficult to reliably deposit the droplets on the particle layer. In contrast, large drops cause the liquid to spread in an inhomogeneous way in the particle layer.

As regards method s for applying the liquid binder material, e.g. so-called airless methods can be used in which pure binder material is forced through a nozzle under high pressure. The air-brush method, in which the binder material is conducted toward a mandrel, where it is entrained by a rapid air current which passes the mandrel, and the rotation method are also suitable. By means of these methods the binder material can be dosed in very fine droplets and very precisely.

An atomizer or nebulizer (aerosol generator) is preferably used for applying the binder material. Devices which can be used for this process have the advantage of requiring only few moving parts and thus being inexpensive.

The liquid binder material may be applied onto the whole surface of the respective layer. However, it is possible according to the invention, to apply the liquid binder material exclusively onto the upper surface of the predetermined sub-area of the respective layer. Such a selective application not only of the curing agent but also of the liquid binder material onto the respective sub-area may be advantageous if the predetermined sub-area of an upper layer laterally extends beyond the sub-area of an adjacent lower layer thereby overlaying a certain part of the lower layer which should not be cured. If this certain part would also contain a binder material which would come in contact with a respective amount of curing agent penetrating the boundery between said upper and lower layers, an undesired curing effect may be caused in the binder material of said certain part of the lower layer near said boundery between the lower and upper layers. Selective application of the binder material or non-selective application of the binder material may be used at choice according to requirements.

The liquid curing agent, too, is preferably applied in the form of liquid droplets of a predetermined diameter, since in this way the curing agent can be spread very homogeneously. The diameter of the droplets preferably also ranges from 5 to 50 $\mu$m.

Since the curing agent is selectively applied in sub-areas, the process of applying the curing agent requires a controllable device. A drop-on-demand print head, as for example known from ink-jet printers, is such a device, which is further a preferred device, as, among other things, it is inexpensive. Print heads using a bubble-jet system or a piezoelectric system can be used. If a drop-on-demand print head is used, the diameter of the droplets of curing agent ranges from 30 to 50 $\mu$m for constructive reasons; at present smaller droplets cannot be generated by means of standard drop-on-demand print heads.

Any liquid binder material capable of forming a two-component mixed adhesive system together with a curing agent, by means of which the binder material is cured, can be used as binder material. For example, furane resin, resol ester or phenolic resin can be used. An organic acid can be used as curing agent.

Preferably, a binder material and a curing agent are used which make it possible to carry out the process at room temperature, since in this way no unnecessarily complex apparatus are required. The viscosity of the binder material at 20° C. preferably ranges from 25 to 50 mPas; the viscosity of the curing agent as applied at 20° C. preferably ranges from 7 to 10 mpas.

Furane resin, which preferably contains furfuryl alcohol in a proportion of at least 50 per cent and ethane dial in a proportion of approximately 4 per cent as well as water, is preferably used as binding material. The preferred curing agent contains toluene sulfonic acid in a proportion of 45 to 55 per cent, diethylene glycol in a proportion of 5 to 15 per cent and sulphuric acid in a proportion of at most 1 per cent. The preferred binder material and the preferred curing agent are preferably used in a ratio of weight of 2:1.

In addition, the curing agent can be diluted with alcohol in a ratio of approximately 2:1, so that it can be applied more easily by means of a drop-on-demand print head. The alcohol vaporizes during the curing process. Additives such as alcohol can be added to the curing agent also for other purposes. On the one hand the cure time of the combined binder-curing-agent-material can be varied by adding additives. On the other hand, if required, the viscosity of the curing agent can be adjusted such that it is possible to perform the method at room temperature.

If both the binder material and the curing agent are applied in the form of droplets, the curing agent is preferred to be diluted with alcohol in such a fashion that the droplets of binder and curing agent can be applied with the same droplet line density or droplet surface density, respectively. A droplet line density ranging from 100 to 600 dpi is preferred.

The method according to the present invention is suitable for manufacturing different parts, for example design models. The method is preferred for manufacturing casting molds or cores, preferably molds.

According to the present invention an apparatus for manufacturing parts comprises the following components:
- a base
- a control unit
- a movable application device which is controllable by means of the control unit and by which layers of a bulk particulate material can be deposited on the base or on a previous layer to form a layer of a predetermined thickness,
- a binder dosing device which is controllable by means of the control unit and which is mounted on a travelling carriage and which comprises a nozzle arrangement by means of which a binder material can be applied in form of droplets of a predetermined diameter all over the whole surface of the respective layer or exclusively onto a selected area of the respective layer, and
- a curing agent dosing device which is controllable by means of the control unit and which is mounted on the carriage and which can be moved perpendicular to the travelling direction of the carriage and by means of which a liquid curing agent can be applied in form of droplets of a predetermined diameter onto selected areas of the layer.

Hereinafter a preferred embodiment of the invention is described on the basis of the drawing. In the drawing FIG. 1a shows a schematic view of a structural part manufactured according to a preferred embodiment of the method according to the present invention in its cross-section in a final stage of production;

Figure 1B:
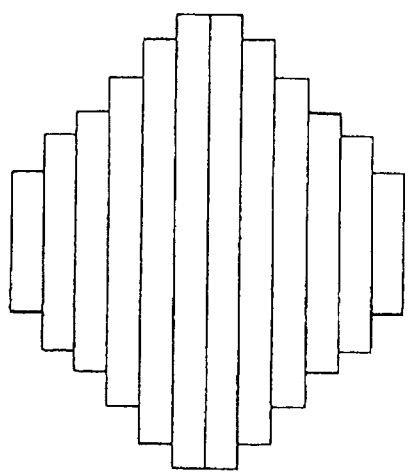
FIG. 1b shows the structural part of FIG. 1a in its finished state.
Figure 1A:
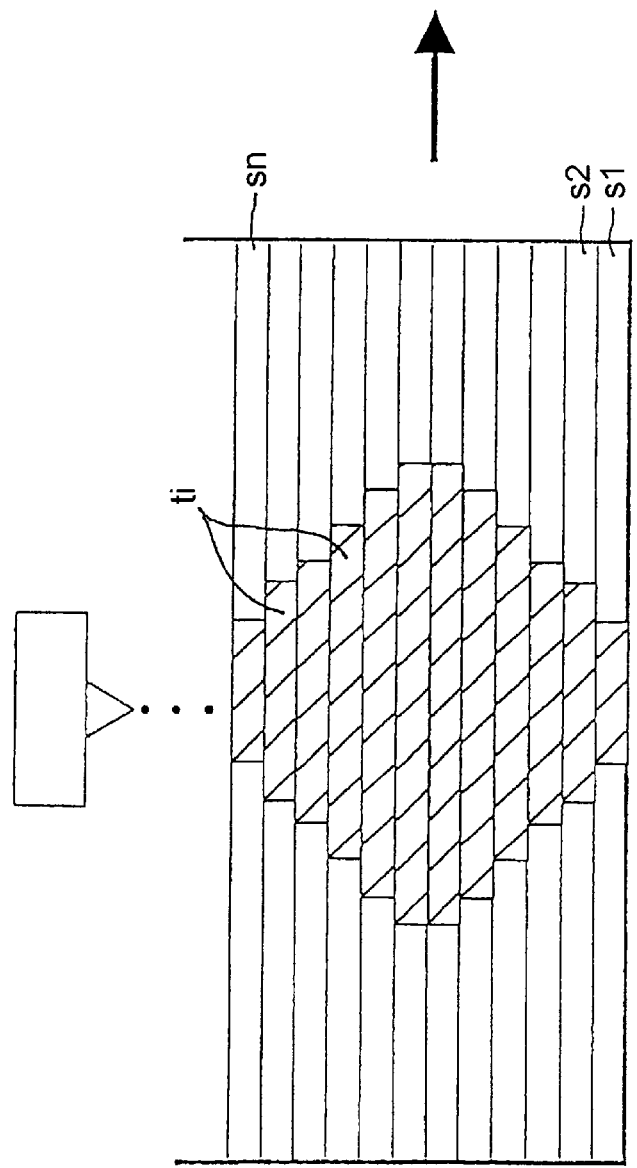

FIG. 1a shows a schematic view of a structural part manufactured according to a preferred embodiment of the method according to the invention in its cross-section when the manufacturing process is finished, from which the principle of the method is apparent. According to the method for manufacturing a part, n layers s1 to sn are successively produced. In a first step a first particle layer s1 is applied all over the whole surface. Subsequently, in a second step the whole surface of the particle layer is all over wetted by the binder material. In a third step the curing agent is then applied in a selected sub-area t1 (hatched) of the first layer s1. These three steps are successively carried out also for the remaining layers s2 to sn. The sub-areas ti, tj for different layers si, sj generally differ from each other, but at least overlap partially, so that they are tightly bonded together.

After the curing agent has been applied to the last layer sn and after the structural part has cured, the non-solidified particulate matter is removed; what remains is the finished structural part shown in FIG. 1b.

For manufacturing a casting mold according to the method according to the present invention particulate material and binder material are applied as described above. In contrast, the curing agent is applied in the area outside sub-area ti, i=1 . . . n. Thus, these areas outside ti solidify. After the process has been completed and the structural part has cured, the non-solidified particulate material in the sub-areas ti, i=1 . . . n, is removed, so that the result is a structural part with a cavity in the form of the body shown in FIG. 1b.

Figure 2:
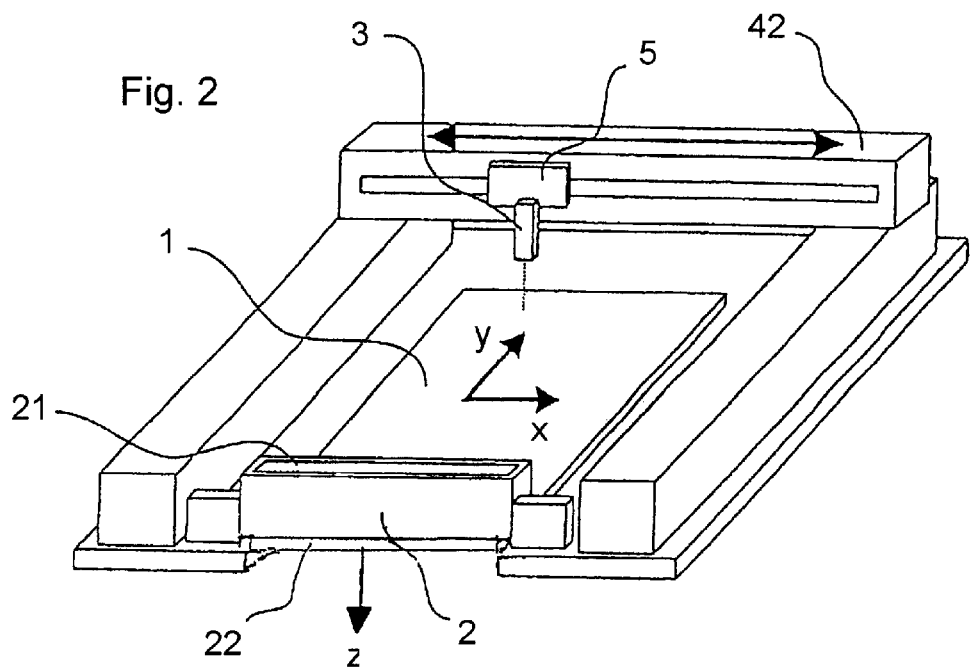
FIG. 2 shows an embodiment of the apparatus according to the invention, while the dosing head is working.
Figure 3:
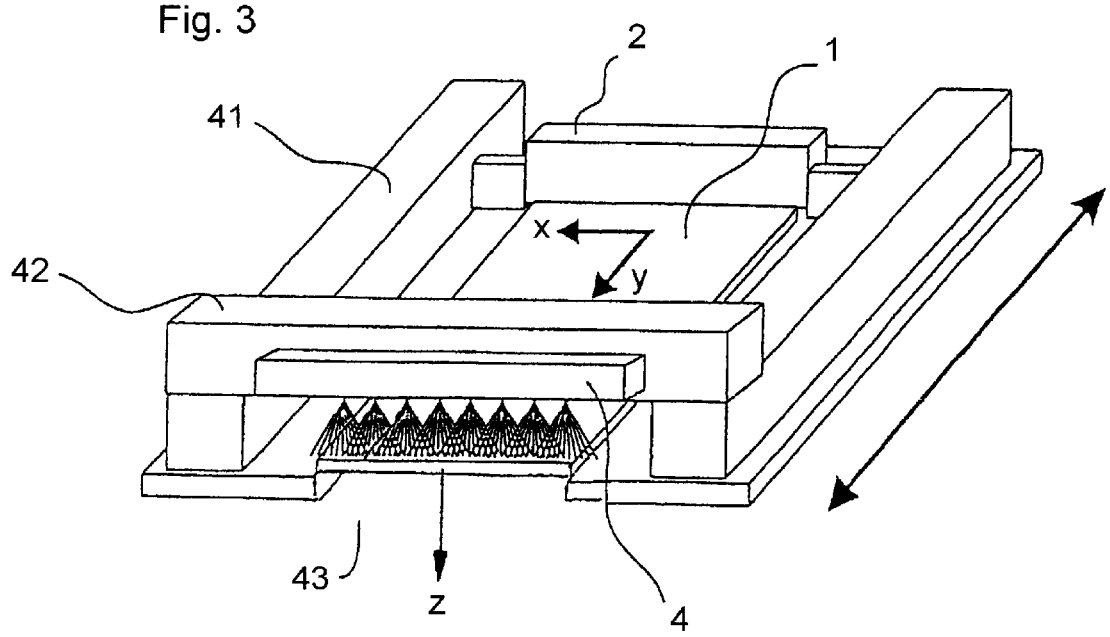
FIG. 3 shows the apparatus of FIG. 2, while the binder material is being applied.

An apparatus according to the invention for manufacturing parts is shown in FIGS. 2 and 3. Such an apparatus comprises the following components:
- a base 1 movable in vertical direction,
- a control unit
- a movable application device 2 which is controllable by means of the control unit and by which layers of a bulk particulate material can be deposited on the base 1 or on a previous layer to form a layer of a predetermined thickness,
- an atomizer device 4 which is controllable by means of the control unit and which is mounted on the carriage 42 and which can be moved horizontally and which comprises a nozzle arrangement 43 by means of which a binder material can be atomized to form droplets of a predetermined diameter and be dosed to be applied all over the whole surface of the layer, and
- a dosing device 3 which is controllable by means of the control unit, which can be moved horizontally and by means of which a liquid curing agent can be atomized to form droplets of a predetermined diameter and be applied to selected areas of the layer.

The base 1 extends in a plane represented by the (x, y) plane made up by the x-axis and the y-axis, the x-axis being perpendicular to the y-axis. The base 1 comprises a first edge 51, a second edge 52, a third edge 53 and a fourth edge 54. The first and the second edge 51, 52 are essentially parallel to each other and essentially run in y-direction. The third and the fourth edge 53, 54 are essentially parallel to each other and essentially run in x-direction. The base 1 can be adjusted vertically in z-direction which is perpendicular to the (x, y)-plane.

The application device 2 for particulate material comprises an oblong case 21 along the x-axis which is open at a lower edge 211 and at an upper edge 212 and is built to hold particulate material and to apply the particulate material to the base 1 or to the previously applied particle layer. Near the open lower edge 211 of the case, which faces the base 1, a discharge device 22 is provided, which comprises distribution blades and which can be opened to various degrees or be closed entirely. The application device 2 can be moved along the y-axis essentially from the first edge 51 to the second edge 52 and vice versa at variable speeds.

The carriage 42 with the nozzle arrangement 43 for applying the binder material is also built to have an oblong form along the x-axis and can be moved along the y-axis essentially from the first edge 51 to the second edge 52 and vice versa. The nozzle arrangement 43 comprises a plurality of adjustable nozzles for discharging binder material, the nozzles being arranged essentially in a linear fashion along a line between the third edge 53 and the fourth edge 54. Alternatively, several lines of nozzles located between the third edge 53 and the fourth edge 54 can be mounted on the nozzle arrangement 43. The nozzles in the different lines can be arranged identically or in a different way.

The dosing device 3 for applying the curing agent can essentially be moved along the carriage 42 along the x-axis from the third edge 53 to the fourth edge 54 and vice versa. This means that the application device 2 for the particulate material and the nozzle arrangement 43 for applying the binder material can be moved into the same x-direction, whereas the dosing device 3 for applying the curing agent is movable perpendicular thereto (the y-direction).

The method according to the invention is carried out by means of the apparatus of the preferred embodiment of the invention as follows.

In the beginning of the process the application device 2, as shown e.g. in FIG. 2, is positioned at the first edge 51 of the base 1. The case 21 contains particulate material and the discharge device 22 is closed. The discharge device 22 of the case 21 is opened, so that particulate material is applied to the base 1 between the third edge 53 and the fourth edge 54; at the same time the application device 2 is moved at a constant speed along the y-axis to the opposite second edge 52, so that the entire base 1 is covered by a homogeneous layer of particulate material. Meanwhile, the case 21 is moved across the base 1 in such a fashion that the particle layer which has already been applied is smoothened by the lower edge 211 of the case 21. The position in z-direction of the base relative to the case 21 is adjusted in such a fashion that, after having been smoothened by the distribution blade at the lower edge 211 of the case 21, the particle layer has a predetermined desired layer thickness. The speed of motion and/or the degree of aperture of the closing device 22 are/is preferably selected and adjusted by means of the control unit in such a fashion that precisely the amount of particulate material is applied to the base 1 which is required to obtain the predetermined layer thickness. As soon as the application device 2 has reached the second edge 52, the supply of particulate matter is interrupted.

As a next step the carriage 42, wich up to now has been in a waiting position at the second edge 52, is moved in y-direction at a constant speed across the base 1 which is now covered by a particle layer until it reaches the first edge 51. At the same time binder material is discharged from the nozzles of the nozzle arrangement 43, so that the particle layer is being homogeneously wetted by the binder material. The speed of motion of the carriage 42 is selected and adjusted by means of the control unit such that a desired, predetermined amount of binder material is applied to/introduced into the particle layer. Finally, the carriage 42 is moved back to the second edge 52 without any material being discharged.

In the next step of the process the curing agent is applied in the form of droplets. For this purpose, the dosing device 3, preferably a drop-on-demand dosing head, as is known from inkjet printers, is used. The dosing device 3 is initially located e.g. at the third edge 53 of the base 1 or outside the base near the third edge 53 (i.e. in the corner formed by the second and the third edge 52, 53). When this step of the process starts the dosing device is controlled such that it travels in x-direction from the third edge 53 to the fourth edge 54. During this process the curing agent is applied to the particle layer containing the binder material in a selected sub-area of the section between the two edges with a predetermined droplet line density in x-direction. In a next step the dosing device is moved back to the third edge 53 without curing agent being applied; at the same time, immediately afterwards or before, the carriage 42 is controlled such that it travels a discrete distance in y-direction toward the first edge 51 and stops again. The discrete distance is comparable to the distance of the droplets of curing agent, which is determined by the droplet line density in x-direction. After having travelled the discrete distance, the dosing device 3 again is moved from the third edge 53 to the fourth edge 54, curing agent being applied in a predetermined sub-area, which usually differs from the sub-area to which curing agent has been applied in the previous cycle. The steps described above are repeated until the carriage 42 has reached the first edge 51, upon which the step of applying curing agent takes place for the last time.

Now the first layer is complete, and the second particle layer is being applied. For this purpose, the base 1 first is moved a discrete z-distance in z-direction away from the application device 2. The z-distance is adjusted such that it is equal to the desired predetermined layer thickness of the second layer to be applied subsequently. In the next steps the particulate material, binder material and curing agent are applied as with the first layer (apart from the fact that the sub-area to be wetted by the curing agent usually differs from the sub-area of the first layer).

The application of the particulate material for the second layer can start at the second edge 52. As an alternative, the application device 2 is moved back to the first edge 51 without any material being applied; in this case the application of the particulate material starts at the first edge 51, as is the case with the first layer.

As an alternative to the above-described method usually employed with ink-jet printers, in which moving of the dosing device 3 is always started from the same edge (53 or 54), the curing agent can be applied both while the dosing device 3 is being moved from the third edge 53 to the fourth edge 54 and while it is being moved back from the fourth edge 54 to the third edge 53. It is also possible for the carriage 42 not to be moved back after the binder material has been applied, but that applying the curing agent is started at that edge of the base 1 at which the application of the binder material has been completed (in the present case it is the first edge 51). It is also possible that moving of the carriage 42 for applying the material is started at the same edge of the base 1 as moving of the application device 2 for applying the particulate material is started.

What is claimed is:

1. A method for manufacturing a structural part by a multi-layer deposition technique, by depositing bulk particulate material in several stacked adjacent layers which are bonded to each other at predetermined sub-areas of the respective adjacent layers, said method comprising a) depositing a porous first layer of bulk particulate material consisting of particles of a predetermined particle size to form a layer of a predetermined layer thickness;

b) applying a predetermined dose of liquid binder material onto at least the sub-area of the first layer, so that the liquid binder material penetrates the sub-area and becomes distributed in the sub-area and wets the particles of the sub-area and a predetermined residual porosity of the sub-area remains after distribution of the liquid binder material;

c) applying selectively a predetermined dose of liquid curing agent, which causes the binder material to cure within a predetermined period of time, to the sub-area of the first layer containing the binder material, so that the curing agent becomes distributed in the sub-area of the first layer; and d) depositing a second layer in accordance with step a) onto the first layer containing the binder material and the curing agent treating the second layer with a binder material in accordance with step b), and treating the second layer, in the sub-area of the second layer overlapping at least part of the sub-area of the first layer, with a liquid curing agent in accordance with step c), wherein the curing agent is applied to the sub-area of the second layer within the predetermined period of time, during which the binder material of the first layer cures selectively in the sub-area of the first layer, so that the binder material in the sub-area of the second layer is bonded to the curing binder material in the sub-area of the first layer before the curing binder material in the sub-area of the first layer has finally cured.

2. The method as set forth in claim 1, wherein the predetermined particle size ranges from 100 to 200 μm.

3. The method as set forth in claim 1, wherein the predetermined layer thickness ranges from 0.15 to 0.3 mm.

4. The method as set forth in claim 1, wherein the liquid binder material is applied in the form of droplets of liquid binder material.

5. The method as set forth in claim 4 wherein the droplets have a predetermined diameter, and wherein the predetermined droplet diameter of the droplets ranges from 5–50 μm.

6. The method as set forth in claim 1, wherein the liquid curing agent is applied in the form of droplets of liquid curing agent of a predetermined droplet diameter.

7. The method as set forth in claim 6, wherein the predetermined droplet diameter of the droplets of curing agent ranges from 5 to 50 μm.

8. The method as set forth in claim 6, wherein a drop-on-demand print head using bubble-jet or piezoelectric systems is used for applying the droplets of curing agent.

9. The method as set forth in claim 1, wherein a sand selected from the group consisting of quartz sand, silicate sand, chromite sand, olivine sand, and zircon sand is used as the particulate material.

10. The method as set forth in claim 1, wherein the predetermined dose of binder material is selected such that the ratio of weight of the binder material relative to particle material ranges from 2 to 3 percent.

11. The method as set forth in claim 1, wherein a material selected from the group consisting of furane resin, resol ester and phenolic resin is used as binder material.

12. The method as set forth in claim 11, wherein furane resin with furfuryl alcohol is used in a proportion of at least 50 percent and ethane diol is used in a proportion of approximately 4 percent.

13. The method as set forth in claim 1, wherein an organic acid is used as curing agent.

14. The method as set forth in claim 1, wherein
the curing agent comprises toluene sulfonic acid in a proportion of 45 to 55 percent, diethylene glycol in a proportion of 5 to 15 percent, and sulphuric acid in a proportion of at most 1 percent.

15. The method as set forth in claim 12, wherein
the curing agent comprises toluene sulfonic acid in a proportion of 45 to 55 percent, diethylene glycol in a proportion of 5 to 15 percent, and sulphuric acid in a proportion of at most 1 percent, and
the binder material and the curing agent are used in a ratio of weight of 2:1.

16. The method as set forth in claim 1, wherein the curing agent is diluted with alcohol in a ratio of approximately 2:1.

17. The method as set forth in claim 1, wherein the binder material and/or the curing agent are applied in corresponding step b) and c), respectively, with a droplet line density ranging from 300 to 600 dpi.

18. The method as set forth in claim 1, wherein in step b), the liquid binder material is exclusively applied to said sub-area.

19. The method of claim 1 wherein the structural part is a mold or a core for a lost-form method.

20. An apparatus for manufacturing parts by a deposition technique, comprising:

a base being vertically movable in a z-direction;

a control unit;

an application device being horizontally movable in a y-direction and being controllable by means of the control unit and by which layers of a bulk particulate material is deposited to form a layer of a predetermined thickness;

a binder dosing device being controllable by means of the control unit and being mounted on a carriage being, above the base, horizontally movable in the y-direction, the binder dosing device further comprising a nozzle arrangement by means of which a liquid binder material is applied in a dosed quantity in form of droplets of a predetermined diameter onto the layer; and a curing agent dosing device being horizontally movable in an x-direction and being controllable by means of the control unit and being mounted on the carriage and by means of which a liquid curing agent is applied in form of droplets of a predetermined diameter to selected sub-areas of the layer.

21. The apparatus as set forth in claim 20, wherein the curing agent dosing device is a drop-on-demand print head using a bubble jet or piezoelectric system.

22. The apparatus as set forth in claim 20, wherein the binder dosing device is a drop-on-demand print head using a bubble-jet or piezoelectric system.

23. The method as set forth in claim 1, wherein the predetermined particle size ranges from 110 to 160 μm.

24. The method as set forth in claim 1, wherein the predetermined particle average size is 140 μm.

* * * * *